US009688397B2

(12) United States Patent
Smith

(10) Patent No.: US 9,688,397 B2
(45) Date of Patent: *Jun. 27, 2017

(54) AIRCRAFT WITH A PLURALITY OF ENGINES DRIVING A COMMON DRIVESHAFT

(71) Applicant: Frick A. Smith, Kingsland, TX (US)

(72) Inventor: Frick A. Smith, Kingsland, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/204,547

(22) Filed: Jul. 7, 2016

(65) Prior Publication Data
US 2016/0311530 A1  Oct. 27, 2016

Related U.S. Application Data

(63) Continuation of application No. 14/251,850, filed on Apr. 14, 2014, now abandoned, which is a
(Continued)

(51) Int. Cl.
*B64D 35/04* (2006.01)
*B64D 27/02* (2006.01)
(Continued)

(52) U.S. Cl.
CPC ........ *B64C 29/0033* (2013.01); *B64C 1/1415* (2013.01); *B64C 1/1476* (2013.01);
(Continued)

(58) Field of Classification Search
CPC ........ B64D 35/04; B64D 35/08; B64D 27/02; B64C 29/00; B64C 29/0016;
(Continued)

(56) References Cited

U.S. PATENT DOCUMENTS 821,393 A    5/1906  Wright
1,322,976 A * 11/1919 Twombly ............... B64C 27/14
                                                    123/179.27
(Continued)

FOREIGN PATENT DOCUMENTS

FR      502 554 A    5/1920
FR    2 397 978 A1   2/1979
(Continued)

OTHER PUBLICATIONS

European Search Report dated Jun. 9, 2016 for European Patent Application No. 11857137.1 (8 pages).
(Continued)

*Primary Examiner* — Tien Dinh
*Assistant Examiner* — Richard R Green
(74) *Attorney, Agent, or Firm* — Dykema Gossett P.L.L.C.

(57) ABSTRACT

An aircraft may have a fuselage, a left wing extending from the fuselage, a right wing extending from the fuselage, a tail section extending from a rear portion of the fuselage, and a first engine and a second engine operably connected by a common driveshaft, wherein the first and second engines are configured for freewheeling such that if one of the first and second engines loses power the other of the first and second engines continues to power the aircraft.

20 Claims, 9 Drawing Sheets

Related U.S. Application Data continuation of application No. 13/442,544, filed on Apr. 9, 2012, now Pat. No. 8,720,814, which is a continuation-in-part of application No. 13/012,763, filed on Jan. 24, 2011, now Pat. No. 8,152,096, which is a continuation-in-part of application No. 11/581,321, filed on Oct. 16, 2006, now Pat. No. 7,874,513.

(60) Provisional application No. 60/727,798, filed on Oct. 18, 2005.

(51) Int. Cl.
| | |
|---|---|
| B64C 27/22 | (2006.01) |
| B64C 29/00 | (2006.01) |
| B64C 1/14 | (2006.01) |
| B64C 27/52 | (2006.01) |
| B64C 39/02 | (2006.01) |
| B64D 17/24 | (2006.01) |
| B64D 17/34 | (2006.01) |
| B64D 17/62 | (2006.01) |
| B64D 17/80 | (2006.01) |
| B64D 31/00 | (2006.01) |
| B64C 27/26 | (2006.01) |
| B64C 27/28 | (2006.01) |
| B64C 27/82 | (2006.01) |
| B64D 17/64 | (2006.01) |

(52) U.S. Cl.
CPC .............. *B64C 27/22* (2013.01); *B64C 27/26* (2013.01); *B64C 27/28* (2013.01); *B64C 27/52* (2013.01); *B64C 27/82* (2013.01); *B64C 29/00* (2013.01); *B64C 29/0016* (2013.01); *B64C 39/02* (2013.01); *B64C 39/024* (2013.01); *B64D 17/24* (2013.01); *B64D 17/34* (2013.01); *B64D 17/62* (2013.01); *B64D 17/64* (2013.01); *B64D 17/80* (2013.01); *B64D 27/02* (2013.01); *B64D 27/023* (2013.01); *B64D 31/00* (2013.01); *B64D 35/04* (2013.01); *B64C 2201/04* (2013.01); *B64C 2201/046* (2013.01); *B64C 2201/088* (2013.01); *B64C 2201/10* (2013.01); *B64C 2201/104* (2013.01); *B64C 2201/108* (2013.01); *B64C 2201/162* (2013.01)

(58) Field of Classification Search
CPC . B64C 29/0033; B64C 27/22; B64C 2201/04; B64C 2201/162
See application file for complete search history.

(56) References Cited

U.S. PATENT DOCUMENTS

| | | | | |
|---|---|---|---|---|
| 1,547,434 | A | 7/1925 | Michaud | |
| 1,623,613 | A | 4/1927 | Arndt | |
| 1,758,498 | A | 5/1930 | Burnelli | |
| 1,861,336 | A | 5/1932 | Cox | |
| 2,437,684 | A | 3/1948 | Custer | |
| 2,510,959 | A | 6/1950 | Custer | |
| 2,514,478 | A | 7/1950 | Custer | |
| 2,702,168 | A | 7/1955 | Platt | |
| 2,767,939 | A | 10/1956 | Taylor | |
| 2,929,580 | A * | 3/1960 | Ciolkosz | B64C 29/0025 244/12.5 |
| 2,936,968 | A | 5/1960 | Mazzitelli | |
| 3,123,321 | A | 3/1964 | Custer | |
| 3,291,242 | A | 12/1966 | Tinajero | |
| 3,298,633 | A | 1/1967 | Dastoli et al. | |
| 3,335,977 | A * | 8/1967 | Meditz | B64C 29/0033 244/12.4 |
| 3,499,620 | A | 3/1970 | Haberkom | |
| 3,578,263 | A | 5/1971 | Gunter | |
| 4,607,814 | A | 8/1986 | Popov | |
| 5,115,996 | A | 5/1992 | Moller | |
| 5,419,514 | A | 5/1995 | Ducan | |
| 5,826,827 | A | 10/1998 | Coyaso et al. | |
| 5,890,441 | A | 4/1999 | Swinson | |
| 6,295,487 | B1 * | 9/2001 | Ono | B60K 6/44 180/165 |
| 6,338,457 | B1 | 1/2002 | Hilliard | |
| 6,367,736 | B1 * | 4/2002 | Pancotti | B64C 29/0033 244/7 C |
| 6,547,180 | B1 | 4/2003 | Cassidy | |
| 6,691,949 | B2 * | 2/2004 | Plump | B64C 29/02 244/12.2 |
| 8,152,096 | B2 * | 4/2012 | Smith | B64C 29/0033 244/12.4 |
| 8,720,814 | B2 * | 5/2014 | Smith | B64C 29/0033 244/12.4 |
| 2003/0080242 | A1 | 5/2003 | Kawai | |
| 2003/0085319 | A1 | 5/2003 | Wagner et al. | |
| 2004/0245374 | A1 * | 12/2004 | Morgan | B64C 29/0025 244/12.3 |
| 2005/0230519 | A1 * | 10/2005 | Hurley | B64C 29/0033 244/7 C |
| 2005/0230524 | A1 | 10/2005 | Ishiba | |
| 2006/0016930 | A1 * | 1/2006 | Pak | B64D 35/04 244/12.4 |
| 2008/0184906 | A1 | 8/2008 | Kejha | |
| 2009/0261209 | A1 | 10/2009 | Mioduchevski | |
| 2010/0038473 | A1 | 2/2010 | Schneider et al. | |
| 2010/0072318 | A1 * | 3/2010 | Westenberger | B64D 27/02 244/54 |
| 2012/0043413 | A1 | 2/2012 | Smith | |

FOREIGN PATENT DOCUMENTS

| | | |
|---|---|---|
| GB | 2 259 115 A | 3/1993 |
| WO | WO 03/004353 A2 | 1/2003 |
| WO | WO 2008/105923 A2 | 9/2008 |
| WO | WO2012/102698 | 8/2012 |

OTHER PUBLICATIONS

Gerra John L. "Making History" Go Boating Magazine, Jul. 2004 pp. 92-97 (6 pages).
Aero-Marine Engine, Inc., "Axial Vector Engine Technology" http://webarchive.org/web/20050311174147/http://www.axialvectorengine.com, (2004) (2 pages).
"Axial Vector Energy Corp." http//www.axialvectorenergy.com (Printed on Sep. 20, 2010) (1 page).
"Perlex Laboratories Inc." http://web.archive.org/web/20080528060430/http://www.pi-labs.com/ May 2008 (2 pages).
Johnson Davey G. "Very Powerful Motor: Tiny Engine Makes Mad Grunt" Apr. 2006 (1 page).
"Launchpoint Technologies" http://web.archive.org/web/20030801171502/http://www.launchpnt.com; Aug. 2003 (1 page).
"Pratt & Whitney" http://web.archive.org/web/19971212020220/http://www.pratt-whitney.com; Dec. 1997 (1 page).
"Pratt & Whitney" http://www.pw.utc.com (Printed on Sep. 20, 2010) (1 page).
"Dyna Cam Product Specification" Jun. 2004, (1 page).
Hugh Nations "Bryan College Station Eagle" Jun. 11, 1985 (3 pages).
Curtis Wright "Curtis Wright VZ-7 Technical Data" 1958 (1 page).
"Bell Model D2127 Technical Data" 1966 (8 pages).
"US Centennial of Flight Commision the Curtiss-Wright X-19" http://www.centennialofflight.gov/essay/Evolution_of_Technology/VSTOL_aircraft/Tech . . . printed on Mar. 17, 2005 (1 page).
"US Centennial of Flight Commision the X-22" http://www.centennialofflight.gov/essay/Evolution_of_Technology/VSTOL_aircraft/Tech . . . printed on Sep. 20, 2010 (1 page).
"Macro Industries Inc." http://www.macroindustries.com/website/files/skyrider/sr-index.htm, Nov. 1998 (2 pages).

(56) References Cited

OTHER PUBLICATIONS

"Bell XV3 Helicopter" http://www.aviastar.org/helicopters_eng/bell_xv-3.php (1955) (6 pages).
"Boeing V-22 Osprey" www-boeing-com-rotorcraft-military-v22-index-2005; Jun. 2010 (5 pages).
"The Full Tilt Flying Machine" Popular Science, Mar. 2006, (2 pages).
"Trek_Aerospace" www-milleniumjet.com May 19, 2006 (4 pages).
"Solo Trek Exoskeletor Flying Vehicle" www-milleniumjet.com Oct. 2000 (1 page).
"Bell Eagle Eye" www-scaled.com/eagleeye/EagleEye.html 1997 (2 pages).
"Doak VZ Trans" www-aerofiles-com/doak-vtrans.jpg Aug. 2001 (1 page).
Michael Kanellos "Flying Car Ready for Takeoff" Feb. 2006 (5 pages).
"Aircraft Information: Cesna 336 & 337" www-airliners-net-aircraft-data-stats-main-id-150-09 Apr. 2008 (2 pages).
McClellan, J Mac. "Flying" Dec. 2007 (7 pages).
"Rutan Aircraft Designs" http://www.centenialofflight.gov/essay/GENERAL_AVIATION/rutan/GA15.htm (Printed on Sep. 20, 2010) (4 pages).
"Eagle Aircraft" http://www.eagleaircraft.webcentral.com Jul. 2005 (1 page).
"Spawn of Osprey" Popular Science, Aug. 2006 (1 page).
"Wheres my flying car?" Popular Science, pp. 43 Mar. 2006 (1 page).
"Welcome to the Custer Channelwing Website" http://www.custerchannelwing.com Dec. 2005 (1 page).
"Rutan Voyager—Smithsonian National Air and Space Museum" http://www.nasm-si-edu-collections.artifact.cfm?id=A19880548000 (Printed on Sep. 20, 2010) (2 pages).
"Dornier Do 335" http://www.aeroflight.co.uk/aircraft/types/dornier-do-335.htm; Mar. 7, 2010 (10 pages).
"Terrafugia Formed to Develop Flying Car" Flying, May 2006, p. 22.
International Search Report and Written Opinion issued in PCT/US2011/022294 dated Mar. 14, 2011 (15 pages).
International Preliminary Report on Patentability issued in PCT App. Serial No. PCT/US2011/022294 dated Jul. 30, 2013 (9 pages).
International Search Report and Written Opinion dated Nov. 22, 2013 issued in PCT/US2013/033985 filed on Mar. 27, 2013 (12 pages).
International Preliminary Report on Patentability issued on Oct. 14, 2014 for PCT Patent Application No. PCT/US2013/033985 (8 pages).
Supplementary European Search Report issued Nov. 17, 2015 for European Patent Application No. 13813670.0 (7 pages).

\* cited by examiner

DUCT POSITION-FORWARD FLIGHT
WITH FORWARD THRUST

DUCT POSITION-VERTICAL LIFT
AND HOVER

DUCT POSITION-BRAKING POSITION
WITH REVERSE THRUST

AIRCRAFT WITH A PLURALITY OF ENGINES DRIVING A COMMON DRIVESHAFT

CROSS REFERENCE TO RELATED APPLICATIONS

This application is a continuation of U.S. patent application Ser. No. 14/251,850 filed Apr. 14, 2014, which is a continuation of U.S. patent application Ser. No. 13/442,544 filed Apr. 9, 2012, now U.S. Pat. No. 8,720,814, which is a continuation-in-part of U.S. patent application Ser. No. 13/012,763 filed Jan. 24, 2011, now U.S. Pat. No. 8,152,096, which is a continuation-in-part of U.S. patent application Ser. No. 11/581,321 filed Oct. 16, 2006, now U.S. Pat. No. 7,874,513, which claims priority to U.S. Provisional Patent Application No. 60/727,798 filed Oct. 18, 2005, the disclosures of each of which are incorporated herein by reference.

FIELD

This invention relates generally to Vertical Take-Off and Landing (VTOL) aircraft and more specifically to a compact VTOL aircraft with a fixed wing which can be utilized as a Personal Air Vehicle (PAV) or an Unmanned Aerial Vehicle (UAV).

BACKGROUND

Inventors have long contemplated and attempted to design vehicles which would serve as a combination car/airplane. That creation could be driven as a car to an airport where it would be converted with wings and then flown like an airplane. Upon landing, the aircraft would be converted back to a car and then driven on a roadway to a destination. The Aerocar (1959) by Molt Taylor and the recent "Transition" flying car by Massachusetts Institute of Technology graduate student Carl Dietrich and the MIT team show a continuation of that dream. However, that dream has not been fully realized, and a need still remains for an aircraft that may operate without being constrained to airports or roadways.

SUMMARY

The present disclosure is directed to an aircraft that contemplates no need for driving a car through traffic to and from airports. The capabilities and properties of this particular aircraft make it compact and versatile enough so as to enable a pilot to fly this aircraft from "door to door" without the requirement of an airport or highways. For example, a person could lift off as with a helicopter from a space such as a driveway, back yard, parking garage, rooftop, helipad, or airport and then fly rather than drive to all the day's various appointments. Some embodiments of the present invention provide a versatile VTOL aircraft that is not only lightweight and powerful enough to take off and land vertically, but is also economical and powerful enough to take off, land and fly at a fast rate of speed, like an airplane. Therefore, it serves as a personal air vehicle (PAV) with a multitude of uses and configurations. The ability to transition from vertical flight to forward flight and back again provides unlimited possibilities because it combines the flexibility and best attributes of both types of aircraft.

In some embodiments, the current invention is able to achieve its power from the placement and production of two (2) Axial Vector/Dyna-Cam type engines mounted sideways with respect to the fuselage of the aircraft (that is, the axis of rotation of the driveshaft of each engine may be oriented transverse to the longitudinal axis of the fuselage). These engines are lightweight and produce greater horsepower and three (3) times more torque per horsepower than conventional engines. Each engine may have a double-ended driveshaft which provides direct drive to the ducted fans/nacelles which are located outside of the fuselage. Each end of each double-ended driveshaft may turn one ducted fan, so two engines will power two (2) pairs of ducted fans for a total of four ducted fans.

Forward Engine

In some embodiments, a first engine may be placed in the front section of the aircraft fuselage, and the driveshafts from the ends of the first engine may run through a front canard wing on the aircraft to a front pair of ducted fans located at the ends of the canard wing. These front ducted fans may be mounted far enough out from the fuselage to prevent propeller wash in the rear ducted fans.

Rear Engine

In some embodiments, a second engine may be mounted behind the passenger cabin and toward the rear of the fuselage. This engine may power an aft pair of ducted fans which are attached to the fuselage, so the driveshaft for this engine may connect directly through a transfer case to differentials in the ducted fans. The rear engine may be slightly elevated above the center line of the side of the fuselage.

In-Line Configuration

The two sideways mounted engines may be placed in-line in the fuselage so the passenger cabin and the rear engine receive less wind resistance, thus reducing drag on the airplane and increasing fuel efficiency. As early as 1937, Dr. Claude Dornier used the in-line configuration in his German built Dornier DO335. By the 1960s, the Cessna Skymaster 336 was using in-line engines, and presently the Adams A500 designed by Burt Rutan is utilizing the configuration. Since the engines are located inside the fuselage rather than outside in the ducted fans or at the end of a main wing, as on the Bell Boeing V-22 Osprey, a better in-line center of gravity is established thereby resulting in quicker response, better balance and increased stability in flight and/or in hover.

Ducted Fans

In some embodiments, the aircraft may have a fixed wing and four aerodynamically designed tilt ducted fans. As early as the 1960s, the Bell X-22A was one of the first aircraft to fly using tilt ducted fans. More recently, Moller's "Skycar" (U.S. Pat. No. 5,115,996) is a vehicle which includes ducted fans with directional vanes and two engines in each duct for a total of eight engines. Unlike the X-22 with its four engines and Moeller's car with its eight engines, some embodiments of this invention use only two sideways placed engines in the fuselage with direct drive from the driveshafts into differentials in the ducted fans to power four ducted fans, with no intervening transmission between the rotor of each engine and the driveshaft or between the driveshaft and the differentials. The elimination of a transmission in such a direct drive embodiment saves weight and increases efficiency and performance.

The fact that only a differential rather than a motor is located in the ducted fans of some embodiments of this invention creates a larger volume of airflow through the ducted fans. Eliminating the weight of the motors or engines outboard of the fuselage also reduces the weight on the side of the fuselage and/or the wing tips, thereby using less horsepower and torque and in turn making the aircraft more responsive and stable.

Most ducted fans have a problem when reaching higher speeds because of a tendency to push air out in front of the duct. In some embodiments of the current invention, the aerodynamic shape of the front of the ducted fans is such that the bottom of each duct protrudes forward and the top of each duct slopes down to the bottom. This lifting air intake duct design creates low pressure in the bottom front of the duct which helps eliminate the need for more wing area and in turn reduces the weight of the aircraft. Willard Custer illustrated this lift principle with his Channelwing aircraft in the late 1930s. This technology is being researched even today at the Georgia Institute of Technology.

Another result of extending the bottom of the ducts is a reduction of the noise created by the turning blades. In a UAV stealth design, this will also help cover the radar signature from the turning blades.

In some embodiments, ducted fans permit the aircraft to take off and land in either conventional or VTOL mode. Since the fan blades may be encased in ducts, the ducts can be rotated to align horizontally with the fuselage, and the aircraft may take off and land conventionally. In some embodiments, such ducted fans may provide greater flexibility in terms of sizing, thrust, and ground clearance than if unducted propellers are used. In some embodiments, a double row of counter-rotating fan blades in the ducted fans may provide sufficient thrust so that the duct diameter may be small enough for sufficient ground clearance. In some embodiments, conventional take-off and landing may also be provided because the double row of counter-rotating blades in the ducted fans allow the ducted fans to be small enough to clear the ground when oriented horizontally. In some embodiments, VTOL is possible because the ducted fans may rotate to a vertical orientation and provide sufficient thrust for take-off and landing.

Lifting Body Airframe

In some embodiments, the aircraft body itself may be an aerodynamically designed lifting body. As far back as the 1920s, Burnelli Aircraft was building a lifting body airframe (U.S. Pat. No. 1,758,498). Today, the Space Shuttle still utilizes that technology. With the engines mounted sideways with respect to the fuselage, this design lends itself to a lifting body application.

Emergency Parachute

Some embodiments of the current invention include a power boosted emergency parachute assembly which can be used in hover or flight conditions, should the aircraft lose one or more of its engines, thus allowing the pilot to continue to maneuver the aircraft to a safe landing.

Fly-by-Wire Control System

Some embodiments of the current invention incorporate a computer controlled fly-by-wire system which calculates gyroscopic stability and sends information to one or more ducted fans or propeller blades to adjust them to the correct pitch for controlled flight.

Fixed Wing with Removable Sections

In some embodiments, the aircraft may have a fixed level, dihedral, or anhedral wing to provide for forward flight in airplane mode. Sections of the aircraft wings may be bolted on or removed to create various wing lengths for different applications, such as for short distances as in a city setting or long distances for long range travel and for easy transporting of the aircraft, as on a trailer or truck or in a shipping container. For example, extensions on the main wing may enable an aircraft to fly at high altitude and/or to loiter for long periods of time.

By combining the attributes of a fixed wing airplane and a helicopter to a lightweight and compact aircraft, a personal air vehicle may become a new mode of transportation. The embodiments set forth herein are merely examples of various configurations of the aircraft, and many new models can result from this invention. Different embodiments of this aircraft could range from a variety and number of passenger seating arrangements to a model with no passengers; i.e., a UAV. In other applications, the aircraft may serve as a personal air vehicle, an air taxi, an observation aircraft, an emergency rescue vehicle, a military vehicle or a UAV, or for other purposes.

Some embodiments may be constructed of lightweight material and the airframe may be designed as a lifting body, which helps reduce the weight and the square footage area of the wings.

Some embodiments may have the vertical take-off, landing and flight capabilities of a helicopter and the conventional take-off, landing and flight capabilities of an airplane. Some embodiments may transition back and forth between VTOL and forward flight. If the aircraft is in hover position, air deflectors (which may be mounted on the rear of each ducted fan) may enable the aircraft to move sideways and to counter rotate, and the tilted ducted fans may enable it to move forward and backward safely in tight spaces. Since some embodiments of the aircraft may use significant power to accommodate its VTOL capabilities, the aircraft may also be designed to take advantage of this power and transform it into maximum airspeed in forward flight.

All these capabilities make this a truly unique aircraft, capable of a multitude of uses. Some embodiments of the current invention can lift off and set down like a helicopter, but can also utilize the speed of an airplane to provide quick "door to door" service for convenience and for the saving of time and fuel.

Since some embodiments of the aircraft can take off like an airplane, it may be capable of handling more weight—such as that of passengers, fuel and freight—on takeoff and then traveling a longer distance. In some embodiments, the aircraft may land in a conventional aircraft mode on a runway, if desired, or the aircraft may land vertically in a smaller space or without a runway. In some embodiments, the compact nature of the aircraft, combined with the use of ducted fans, may provide a large spectrum of landing locations for it as a VTOL vehicle.

Although some embodiments of the aircraft may not be as fast as the new light jets currently being developed and soon to be offered for air taxi service, the aircraft nonetheless saves overall time because it can take off and land in locations other than a landing strip. Time commuting to and from an airport can be significant, and some embodiments of this aircraft may provide a means to bypass airports by leaving from and returning to a nearby convenient location.

In some embodiments, one advantage of the fixed wing aircraft is the ability to throttle back the engines and use lift from the wing to help the engines conserve fuel while flying. In some dual engine embodiments, either engine may be shut off, and the aircraft can cruise on one engine for improved fuel economy. For example, Burt Rutan's Voyager took off using both engines, then shut down one engine and flew around the world—using one engine—without refueling. Additionally, the wing may be dihedral, which may improve the stability of the aircraft.

In some dual engine embodiments, if one engine is lost, the aircraft can fly on either of its engines and continue to an airport to land conventionally. If both engines are lost while in flight, the aircraft's glide slope is excellent. The pilot can glide the aircraft to a landing site or use a guidable emergency parachute to float to a safe location.

In some embodiments, another advantage derives from the fact that the engines are not in the ducts but are instead mounted in the fuselage, providing an in-line center of gravity for better stability and increased response (as opposed to having the weight of the engines on the wingtips). Additionally, the front engine may break the air for both the cabin and the rear engine, thus creating a very aerodynamic lifting body aircraft.

In some embodiments, the elevation of the rear engine may allow for air intake scoops to be mounted on the front of each side of the engine, thereby providing for air cooling of the rear engine while still maintaining the aircraft's aerodynamic design. In conventional airplane mode, this elevation may also improve the flare of the aircraft upon landing and derotation and may allow the rear landing gears to hit the runway first. It also may improve take-off and rotation because the front landing gear of the aircraft may lift off first.

In some embodiments, another advantage in landing an aircraft as described herein is that, in the case of an engine being lost, the two ducted fans attached to that engine may stop also. Consequently, the critical engine problem which causes yaw and then roll, usually experienced when a twin engine aircraft loses an engine, may be eliminated. Additionally, if an engine is lost, some embodiments of the aircraft are capable of auto feathering the fan blades of the two ducted fans associated with that engine, thereby reducing drag through the duct.

In some embodiments, the sideways placement of the engines may provide the ability to power two ducted fans with one engine having a double-ended driveshaft. In such embodiments, the cost of construction and operation of the aircraft may be less, for example, because only two engines may be used to power four ducted fans.

In some embodiments, one or more driveshafts of the rear engine may be shortened going into the associated rear ducted fans because the ducted fans may be mounted on the side of the fuselage, and one or more driveshafts of the front engine may be shortened going through a canard wing which may not be as long as a main wing. This configuration not only may reduce the weight of the one or more driveshafts, but may also provide an enhanced safety factor. Since a driveshaft may enter the middle of a differential in a ducted fan, the driveshaft may naturally turn two output shafts of the ducted fan in a counter rotating motion. This reliable yet simple design may also add to the safety of the aircraft.

In some embodiments, the aircraft may use an Axial Vector/Dyna-Cam type engine which may provide many advantages, including very smooth operation with little vibration and utilization of a variety of fuels and high fuel efficiency. The Axial Vector/Dyna-Cam type engine is a lightweight, small and compact internal combustion engine with high horsepower and high torque. A high torque engine may allow a high angle of attack on variable pitch blades, which may provide quick response with little variation in the rpm of the engine.

In some embodiments, the ducts of the ducted fans may be aerodynamically designed to create lift thereby reducing the weight of the aircraft because of less square footage of wing area than otherwise may be required. Since no engines are located in the ducts, more area is available for airflow through the ducts, thus creating more lift and thrust. In some embodiments, the front pair of ducts may be mounted far enough out on the canard wing to allow the rear ducts to receive undisturbed air.

In some embodiments, two rows of blades in a ducted fan may turn in a counter rotating motion thereby creating more thrust and reducing the overall diameter of the duct. This reduced diameter may provide sufficient ground clearance for a conventional aircraft take-off and landing mode as well as VTOL and VSTOL capability.

Tilt ducted fans may provide the ability to get full thrust on lift and forward flight. The aerodynamic shape of the lifting duct may provide for more lift with less weight since a shorter wing may be used.

In some embodiments, the blades in each row of a ducted fan may have variable pitch. The pitch angle of the blades may be determined and controlled by a computer in communication with gyros in a fly-by-wire system, thus controlling pitch for stability in a hover mode or adjusting pitch while in forward flight. The blades may have the capability of self feathering and lining up in an identical configuration behind one another within each duct to help reduce drag and increase air flow through the ducts should an engine be lost or shut down. This capability may extend the range which can be flown with one engine.

In some embodiments, the use of ducted fans instead of un-ducted propellers may provide for safer VTOL. In such embodiments, no exposed propellers are involved, so the aircraft can land in tight spaces or get close to people or to stationary objects. For example, it could hover next to buildings for rescues, land in fields with electrical wires, and/or land in neighborhoods or a regular parking lot. In such embodiments, since ducts surround the fan blades, the ducted fans may be quieter, enabling the aircraft to take off and land with less noise than is typically associated with helicopters. This ducted fan design may also help reduce or cover the radar signature from the turning blades in a UAV stealth design.

NASA has been researching and developing its "highway in the sky" which provides synthetic vision and GPS guidance in aircraft so that pilots can bypass the large congested airport hubs and land at smaller airports. That technology may be included in some embodiments of this invention, which may allow pilots to bypass even the small airports and land at or near their actual destinations, and it may assist in handling bad weather such as fog.

Some embodiments of this invention may include an emergency parachute system that provides for quick deployment and rapid expansion to prevent significant altitude loss while in hover or for a delayed deployment while in forward flight. Most of the currently used emergency parachutes—often referred to as whole-airplane recovery parachute systems—require too much time to fill with air, resulting in a significant loss of altitude before the parachute can take effect.

The Ballistic Recovery System (BRS) which was invented and patented by Boris Popov (U.S. Pat. No. 4,607,814) was originally created for ultralights and experimental aircraft and later retrofitted for larger aircraft. The BRS system is currently utilized by Cirrus Design for its lighter single engine airplanes. However, the emergency parachute system in the Cirrus aircraft allows a significant loss of altitude before the canopy is filled with air. Once the Cirrus is descending under the parachute, the pilot has no control of the descent and therefore no control of the landing site. The rocketed parachute system in some embodiments of the present invention may rapidly deploy and expand the parachute and then allow the pilot to steer the parachute to get the aircraft to a preferred landing site.

A sport plane embodiment of this aircraft may have a fuselage having a longitudinal axis, a left wing extending from the fuselage, a right wing extending from the fuselage, a tail section extending from a rear portion of the fuselage, a first ducted fan rotatably mounted to the left wing, a second ducted fan rotatably mounted to the right wing, and an engine disposed in the fuselage, the engine having a direct-drive, double-ended driveshaft having an axis of rotation oriented transverse to the longitudinal axis of the fuselage, wherein the first ducted fan includes a first differential operably connected between first and second rows of counter rotating fan blades, wherein the second ducted fan includes a second differential operably connected between third and fourth rows of counter rotating fan blades, and wherein one end of the driveshaft is directly connected to the first differential, and the other end of the driveshaft is directly connected to the second differential.

BRIEF DESCRIPTION OF THE DRAWINGS

FIG. 3b is a top schematic cross-sectional view of the ducted fan assembly of FIG. 3a.

FIG. 3c is a front view of the ducted fan assembly of FIG. 3a.

DETAILED DESCRIPTION

As used herein, the following terms should be understood to have the indicated meanings:

When an item is introduced by "a" or "an," it should be understood to mean one or more of that item.

"Comprises" means includes but is not limited to.
"Comprising" means including but not limited to.
"Having" means including but not limited to.
"Including" means including but not limited to.

VTOL Aircraft with Sideways Mounted Engines

Figure 1:
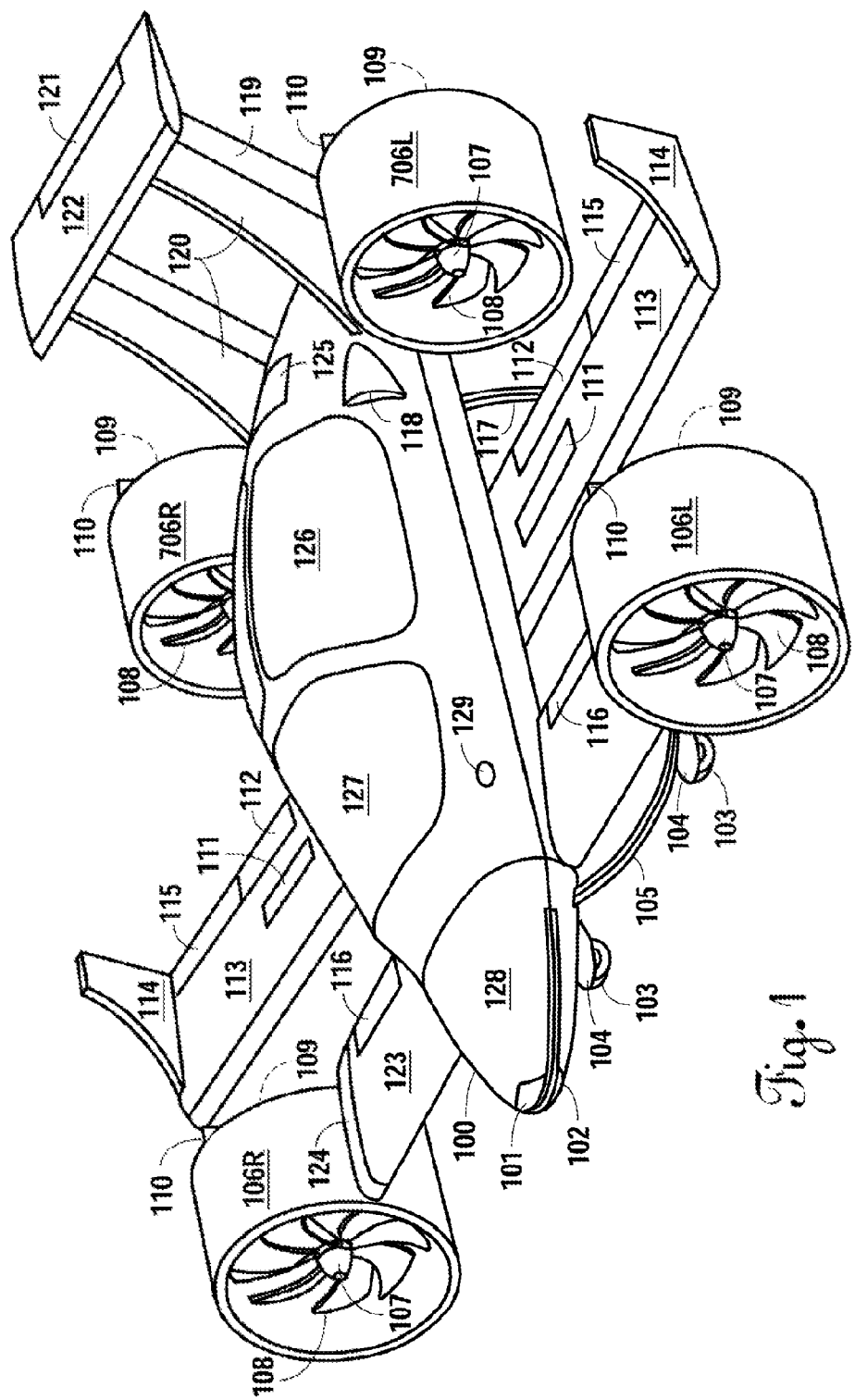
FIG. 1 is a front perspective view of a four ducted fan aircraft embodiment of the current invention.
Figure 2A:
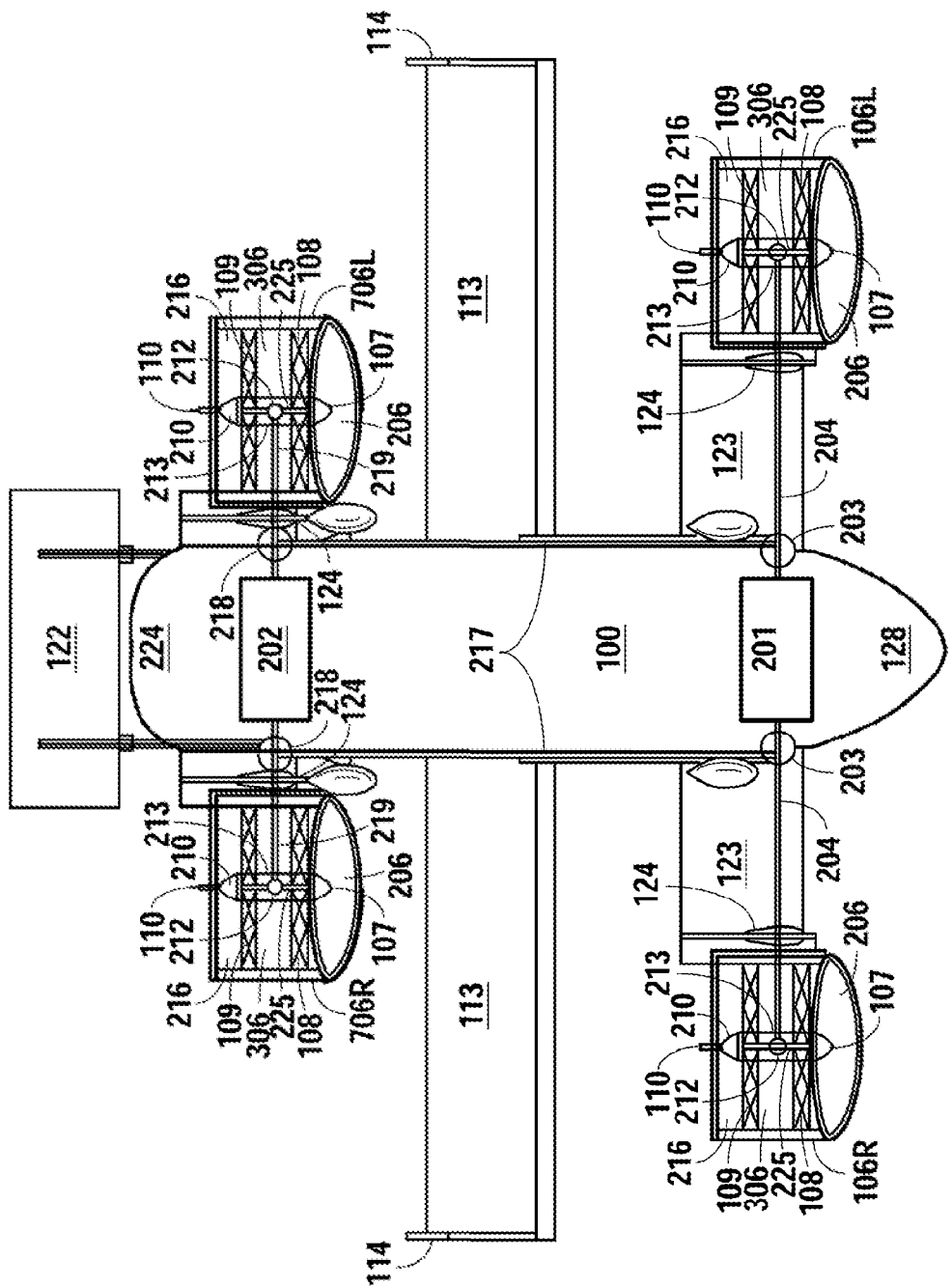
FIG. 2a is a top schematic cross-sectional view of the aircraft of FIG. 1 showing single engines serving the front and rear pairs of ducted fans.

As shown in FIGS. 1 and 2a, a first embodiment of the current invention may have four ducted fans. This embodiment is a VTOL aircraft with two (2) engines—one fore 201 and one aft 202—placed sideways with respect to an elongated lifting body fuselage 100, which may be made of lightweight composite materials, aluminum, or other suitable materials. This embodiment may have a canard wing 123 on the front, a fixed main wing 113 in the middle of the fuselage 100 with winglets 114 attached on each end of the main wing 113, two vertical stabilizers 120 on the rear, a horizontal stabilizer 122 across the top of the tail, a pair of ducted fans 106R and 106L fore, and a pair of ducted fans 706R and 706L aft on each side of the fuselage 100 for a total of four (4) ducted fans. The canard wing 123 and the main wing 113 may be level, dihedral, or anhedral, depending on the overall aerodynamic design of the aircraft. In this example, all four ducted fans may have the same design and are sometimes referred to as element 106 in the discussion of this embodiment. Alternatively, the ducted fans may not all have the same design. In other alternative embodiments, un-ducted propellers may be used instead of ducted fans, or a combination of ducted fans and un-ducted propellers may be used.

The engines 201, 202 may be Axial Vector/Dyna-Cam type engines or other suitable engines. The Axial Vector engine from Axial Vector Engine Corporation is a six piston twelve cylinder radial design with high horsepower and torque. The engine is small, lightweight and produces three times the torque per horsepower as compared to some other available engines, thus improving the power-to-weight ratio. It is fuel efficient and can use a variety of fuels. It has fewer parts and produces less vibration than some other available engines.

Passenger Cabin

In this example, the passenger cabin may have a lightweight frame made of composite, aluminum, or other suitable material with one stationary front wraparound transparent canopy 127 which serves as the windshield, and two pivotally hinged gull wing style doors 126 which are wraparound door frames with transparent window material encompassing most of the surface to serve as the side windows and skylights on each side of the fuselage 100. The doors 126 may also be made of composite, aluminum, or other suitable material. To clarify, these doors 126, when closed, may serve as skylights on the top and windows on the side. The pilot and front passenger side of the cabin may have transparent material of oval or other suitable shape in the floorboard which may provide for downward viewing and may also provide an emergency escape hatch. The side door 126 may pivot wide open to allow for loading/unloading of large loads; e.g., an emergency stretcher or large cargo. It may open large enough to accommodate the ingress and egress of both the front and rear passengers. Some embodiments of the present invention may have a four-seat cabin, but other embodiments may include fewer or more than four seats, and still other embodiments may be utilized as an unmanned aerial vehicle (UAV) with no seats.

Forward Section of the Aircraft

The headlights/landing lights encasement 101 may have a streamlined transparent protective covering located on the nose of the fuselage 100 and one front air intake 102 may be located on each side of the nose of the fuselage 100. A canard wing 123 may be attached to the front fuselage 100, with a ducted fan 106 attached to each end of the canard wing by a duct rotation actuator 124. Elevators 116 on the trailing edge of the canard wing may facilitate in controlling the pitch of the aircraft.

Each of the ducted fans 106 may house a front blade actuator assembly 107 which controls the pitch angle of a front row of blades 108 and a rear blade actuator assembly 210 which controls the pitch angle of a rear row of counter rotating blades 109 (hidden in FIG. 1; see FIGS. 2a, 2b, 3a, 3b). A duct air deflector 110 may be located on the rear of each ducted fan 106. Each of the four ducted fans 106 on the aircraft may contain the same front and rear blade assemblies and configuration, and each may or may not have a duct air deflector 110 on the rear of the ducted fan 110. Alternatively, the ducted fans 106 may not all be of the same design. For example, in some embodiments, the forward ducted fans 106 may be of one design, and the rear ducted fans 106 may be of a different design. The air deflector 110 may facilitate control of the transition from forward flight to hover and back to forward flight or from hover to forward flight and back to hover, and control of the sideways and counter rotating motion when in hover.

One front tire 103 may be located on the front bottom of each side of the fuselage and may be attached to a fixed front landing gear spar 105 and may be partially covered by a streamlined fairing 104 which is wrapped around each tire 103. Alternatively, the tires 103 and associated landing gear may be retractable into the fuselage 100 or the canard wing 123. The spars 105 may be fixed, and the tires 103 may be pivoting to provide a tight turning radius. A first avionics bay 128 for storing the aircraft's computer, gyroscopic equipment, etc. may be located inside the nose cone. This avionics bay 128 may house the flight computers and gyroscopes which handle guidance, navigation and control; for example, it may serve as a data bus which takes the flight instrumentation, weather and additional data, along with pilot input, to control flight. A second bay may be located in the back (not shown) for redundancy.

Center of the Aircraft

The main wing 113 may be attached to the bottom of the fuselage 100 below the passenger cabin doors 126. Alternatively, the main wing 113 may be attached to the top of the fuselage 100 or to some intermediate portion of the fuselage 100. A speed brake 111 may be located toward the center of the wing 113 on each side of the fuselage to enable the aircraft to slow while in forward flight. The wing 113 may include winglets 114 to help reduce drag and thereby increase speed and lift; ailerons 115 to help control roll while in forward flight; and flaps 112 to help reduce landing speed, move into transitional speed while switching from horizontal to vertical and/or back to horizontal flight, and decrease the surface area of the wing thus resulting in less drag on vertical take-off. In some embodiments, other control surfaces may be employed in combination with or in lieu of speed brakes 111, ailerons 115, and flaps 112.

Rear Section of the Aircraft

One rear tire (not shown in FIG. 1) may be attached to a fixed or retractable rear landing gear spar 117 on each side of the fuselage 100 toward the aft section of the aircraft. Each of these rear tires may be fixed and covered by a streamlined fairing 104 or retractable into the aft portion of the fuselage 100 and may be equipped with brakes.

A ducted fan 106 may be located on each side of the fuselage 100 with the attachment point located behind the rear passenger cabin/canopy 126.

The rear engine 202 may be mounted slightly higher than the front engine 201 to provide room for air intake cooling which may be accomplished through an air intake scoop 118 located behind the passenger cabin/canopy 126 and on each side of the fuselage 100.

One fixed vertical stabilizer 120 may be attached on each side and at the end of the fuselage 100 to minimize or eliminate the yaw/roll oscillations and to reduce the drag off the aft end of the lifting body fuselage 100. A rudder assembly 119 attached to the rear of each vertical stabilizer 120 may help provide yaw control. Atop the vertical stabilizers 120, a horizontal stabilizer 122 may be attached, with a rear elevator 121 located on the trailing edge of the horizontal stabilizer 122 for pitch control.

An emergency parachute with deployment rocket launchers may be stored in a storage location compartment 125 in the rear fuselage 100, just behind the passenger cabin/canopy 126 and above the rear engine 202. The parachute cables may be attached to the aircraft at four attachment points 129 (three not shown). Two of these attachment points 129 may be located on each side of the aircraft, with two fore and two aft. The front parachute cable on each side may be routed from the attachment point 129 on the front of the aircraft, up the side of the fuselage 100 between the front canopy 127 and rear canopy 126, across the top of the fuselage 100 between the left and right hinged gull wing doors 126, and back to the parachute storage compartment 125. The rear attachment points 129 may be located behind and above the air intake scoop 118 on each side of the aircraft. The rear parachute cable on each side may be routed up the side of the aircraft from the attachment point 129 to the storage compartment 125. All the parachute cable routings may be concealed in a recessed channel under a non-protruding breakaway covering (not shown) which is aerodynamically flush with the fuselage 100.

As shown in FIG. 2a, two double-ended, direct driveshaft engines 201, 202 may be mounted longitudinally in-line with one another in the fuselage 100, with one fore and one aft. Engines 201 and 202 may be oriented "sideways" with respect to the fuselage 100 such that the axis of rotation of the driveshaft 204 and 219, respectively, of each engine is oriented transverse to the longitudinal axis of the fuselage. A first engine 201 may be placed sideways in the front portion of and with respect to the fuselage 100, and a second engine 202 may be placed sideways in the rear portion of and with respect to the fuselage 100. Each engine 201, 202 may have a double-ended driveshaft 204 or 219, respectively, which powers a pair of ducted fans 106R and 106L forward, and 706R and 706L aft. One ducted fan 106R, 106L may be mounted on each end of the front canard wing 123, and one ducted fan 706R, 706L may be mounted on each side of the fuselage 100 behind the passenger cabin/canopy 126.

In general, this embodiment of the current invention includes a first power generation device or engine 201 forward in the fuselage, which is used to power a first driveshaft that serves a ducted fan or propeller on the right canard wing and to power a second driveshaft that serves another ducted fan or propeller on the left canard wing. In some embodiments, the first power generation device may be a single engine, and the first driveshaft and the second driveshaft may be a single continuous driveshaft 226 that goes through the engine and protrudes out each end of the engine. In other embodiments described below, the first power generation device may be two or more engines in alignment, and the first and second driveshafts may be a single continuous driveshaft or may be separate distinct driveshafts, which may be coupled together to act as a single driveshaft. The same is true for the rear power generation device or engine 202 and its associated driveshaft(s).

Forward Engine

The front engine 201 may be mounted in a sideways position with respect to the fuselage 100 between the nose of the aircraft and the front section of the cabin/canopy 127. As the double-ended direct driveshaft 204 exits each end of the front engine 201, each side of the driveshaft 204 runs in an opposite direction and exits the fuselage 100 through a transfer case 203, continues span-wise through the canard wing 123 and duct rotator actuator 124, and connects to an internal duct differential 212 in a mid portion of the ducted fans 106L and 106R. The portion of the driveshaft 204 that exits the left end of the engine 201 runs to the left to power the left front ducted fan 106L; the section of the driveshaft 204 that exits the right end of the engine 201 runs to the right to power the right front ducted fan 106R.

Rear Engine

The rear engine 202 may be mounted in a sideways position with respect to the fuselage 100 behind the passenger cabin/canopy 126. Rear engine 202 may be located in-line with the front engine 201 and may be slightly elevated above the center line of the fuselage 100. Two air intake scoops 118, with one mounted on each side of the fuselage in front of the rear engine 202, may provide for air cooling of the rear engine 202. The rear direct driveshaft 219 may be shorter than the front driveshaft 204 because the rear ducted fans 706L and 706R may be mounted on each side of the fuselage 100 just behind the passenger cabin/canopy 126. Similar to the front engine 201, the double-ended direct driveshaft 219 exits each end of the rear engine 202, and each side of the driveshaft 219 runs in an opposite direction and exits the fuselage 100 through a transfer case 218, continues through a duct rotator actuator 124, and connects to an internal duct differential 212 in a mid portion of the ducted fans 706L and 706R.

In this embodiment, the front transfer case 203 and the rear transfer case 218 may be connected by a transfer case supplemental driveshaft 217 which runs just inside of each side of the fuselage 100 between the transfer cases 203 and 218. These supplemental driveshafts 217 are not normally engaged; however, should one engine lose power (sometimes referred to herein as a "dead," "lost," or "non-working" engine), a computer or other controller may engage the supplemental driveshafts 217 in the transfer cases 203, 218 thereby bypassing the non-working engine. Through the transfer cases 203, 218 and supplemental driveshafts 217, the working engine may provide power to operate the pair of ducted fans 106R and 106L, or 706R and 706L, as the case may be, of the non-working engine and thus keep the aircraft in a stable position.

The mechanics inside each of the ducted fans 106R and 106L may be identical except for the entry of the driveshaft 204 through the duct rotator actuator 124 into the duct. The front 204 and rear 219 driveshafts extending from the right sides of the engines 201, 202 enter the right front and right rear ducted fans 106R and 706R from the left; and the front 204 and rear 219 driveshafts running from the left sides of the engines 201, 202 enter the left front and left rear ducted fans 106L and 706L from the right.

Figure 3A:
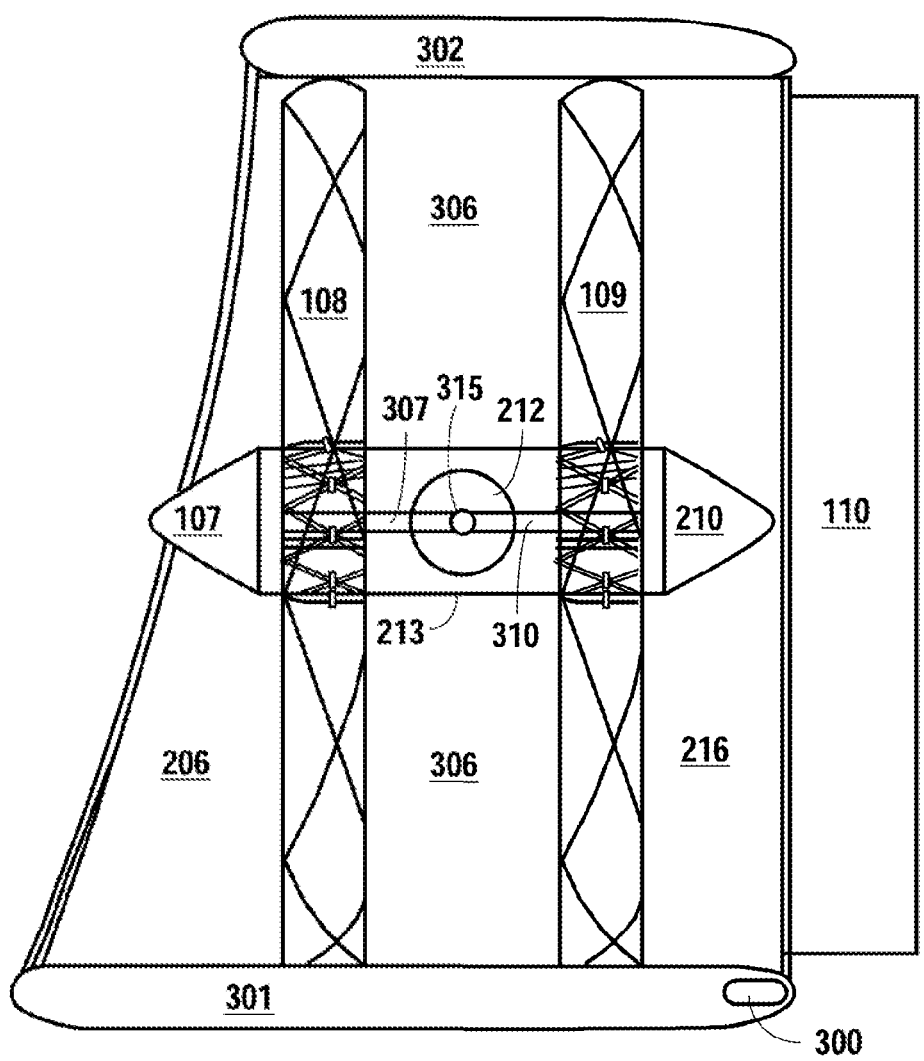
FIG. 3a is a side schematic cross-sectional view of a ducted fan assembly.
Figure 3B:
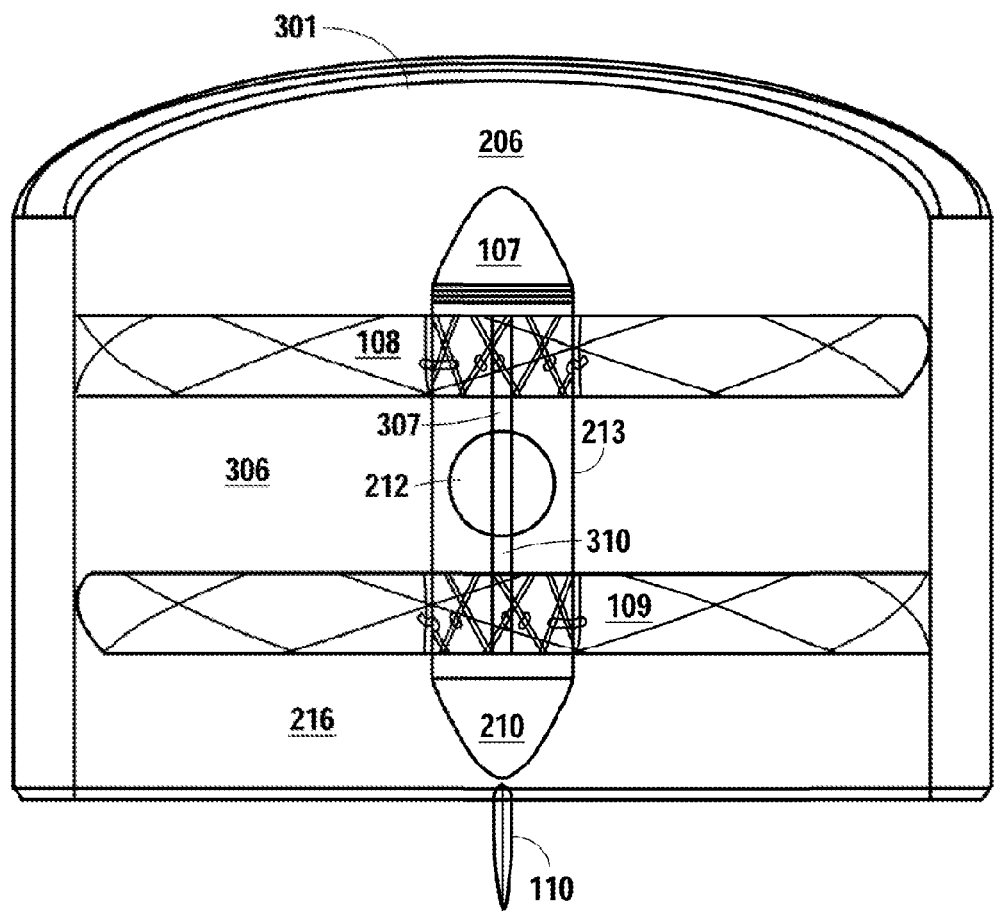
Figure 3C:
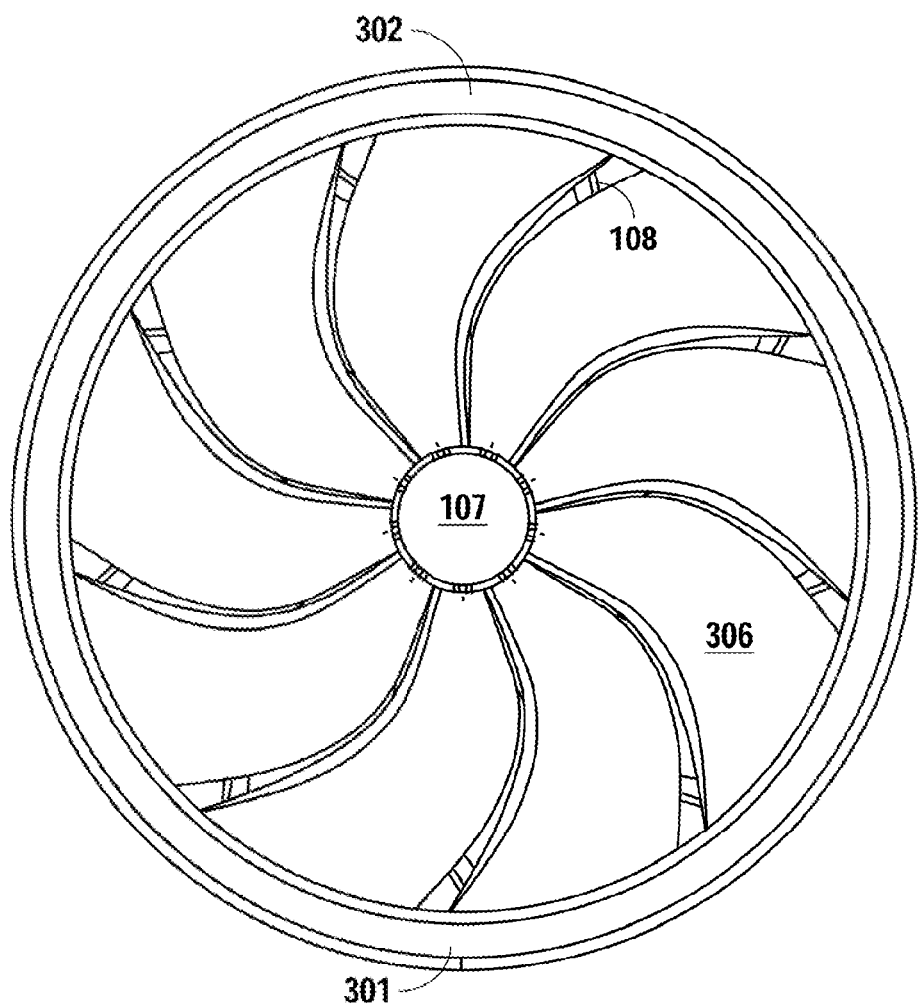
Figure 4A:
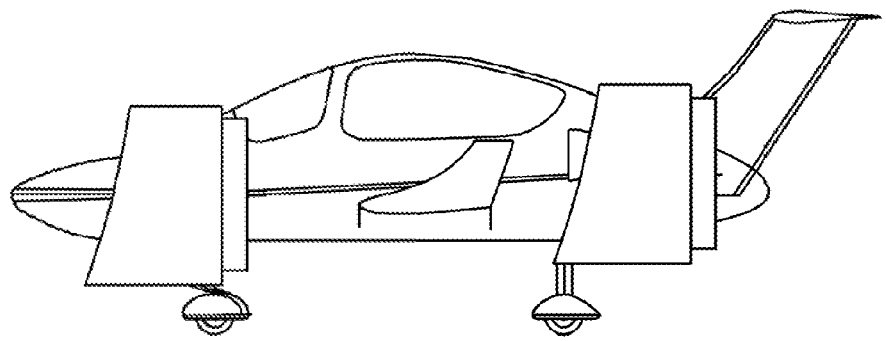
FIG. 4a is a side view of the aircraft of FIG. 1 in forward flight with rear thrust.
Figure 4B:
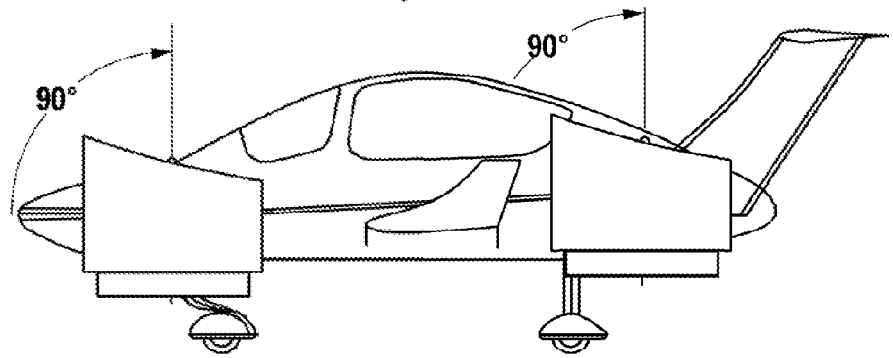
FIG. 4b is a side view of the aircraft of FIG. 1 in hover with downward thrust.
Figure 4C:
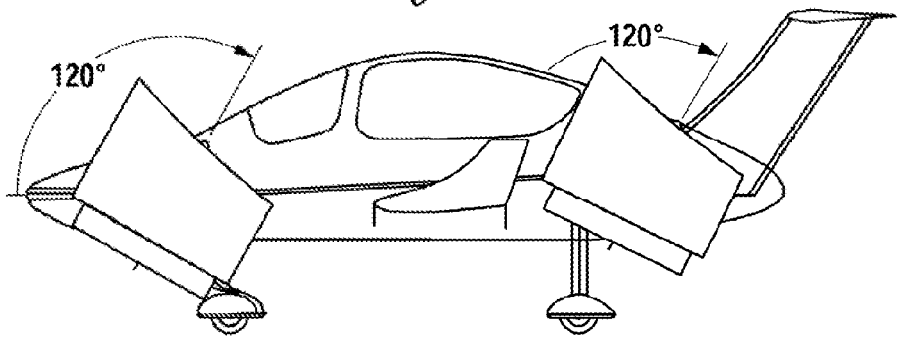
FIG. 4c is a side view of the aircraft of FIG. 1 in braking position with reverse thrust.

In each of the four ducted fans 106, a differential casing 213 may house the differential 212 and two differential output driveshafts 225. The differential 212 may turn the two differential output driveshafts 225 in a counter rotating motion with one shaft powering a row of variable pitch blades 108 at a front low pressure air intake opening 206 and one powering another row of variable pitch blades 109 at a rear air output expansion chamber 216 of each ducted fan 106. These blades 108, 109 may turn in a counter rotating motion with two computer controlled actuator assemblies—one front 107 and one rear 210—determining the pitch of the blades. As the actuator assembly 107, 210 increases the pitch of the blades 108, 109 in each of the ducted fans 106, air flow is increased through the front air intake 206, is compressed in the high pressure chamber 306, and is exhausted by the rear row of blades 109 through the expansion chamber 216. This creates the thrust for takeoff in either vertical or forward flight. FIGS. 3a, 3b, and 3c show enlarged illustrations of the ducted fans 106, and FIGS. 4a, 4b, and 4c illustrate various rotational positions of the ducted fans 106 and how they affect take-off, flight, hover, and braking.

Figure 2B:
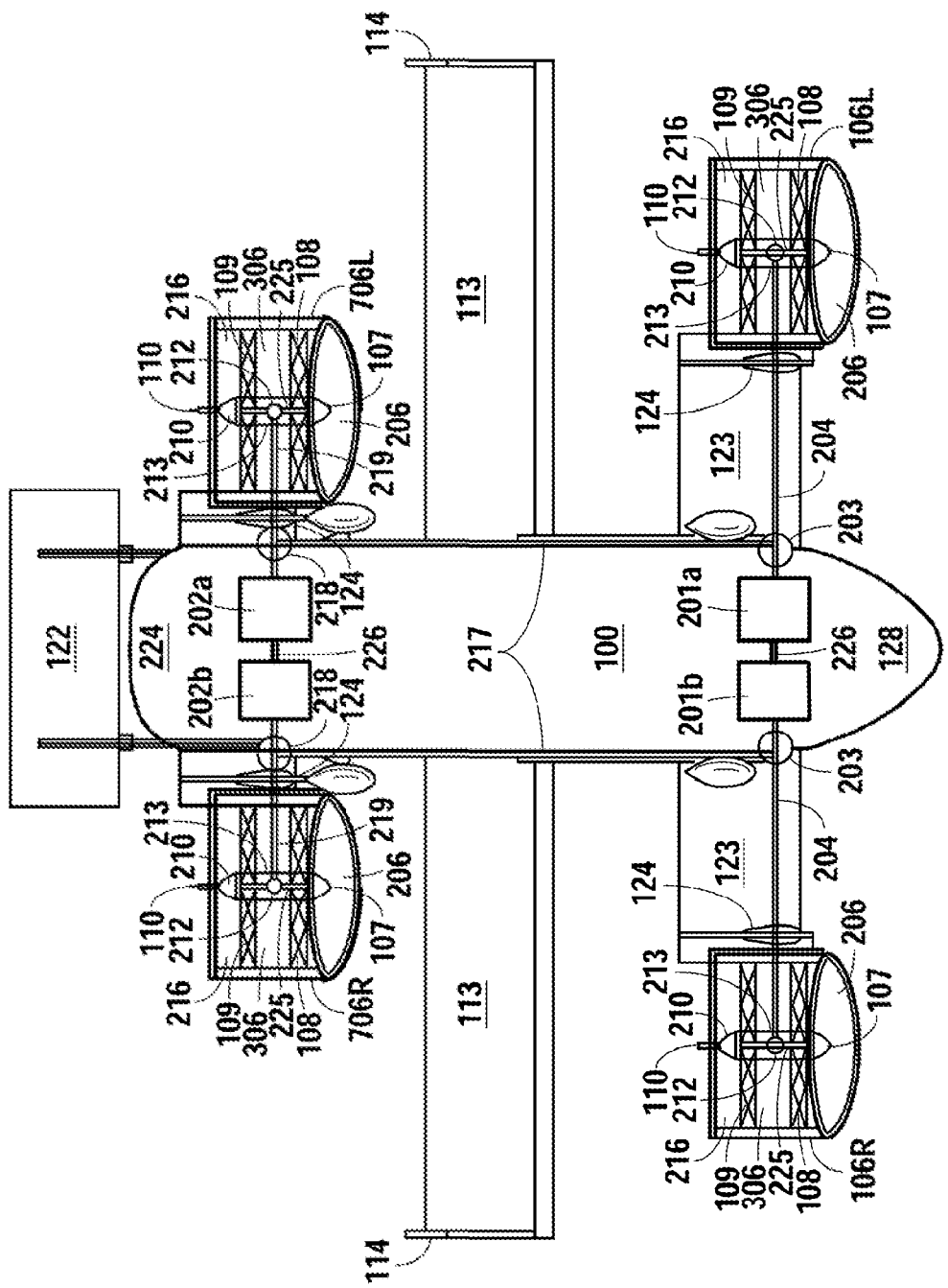
FIG. 2b is a top schematic cross-sectional view of the aircraft of FIG. 1 showing pairs of engines serving the front and rear pairs of ducted fans.

As shown in FIGS. 3a, 3b and 3c, each of the ducted fans 106 is a ducted tilt rotor, which may be composed of a lightweight composite, aluminum, or other suitable material. The rows of blades 108, 109 inside the ducts may be driven by a direct driveshaft 315 from a double-ended engine 201, 202 which is mounted sideways with respect to the aircraft fuselage 100 as described above. Referring also to FIGS. 2a and 2b, driveshaft 315 may be located in either the front of the aircraft as shown by element 204 or in the rear of the aircraft as shown by element 219. The driveshaft 315 may enter each ducted fan 106 from the side and connect inside the differential casing 213 with the differential 212 in a mid portion of the ducted fan 106. Extending from the differential 212, a forward output shaft 307 and a rear output shaft 310 may respectively drive a forward row of fan blades 108 in a front portion of each ducted fan 106 and a rear row of fan blades 109 in a rear portion of each ducted fan 106. The fan blades 108, 109 may turn in a counter rotating motion which may create more thrust and reduce the overall diameter of the ducted fans 106, thereby providing sufficient ground clearance for conventional aircraft take-off and landing mode as well as VTOL capability.

FIG. 3a and FIG. 3b illustrate the aerodynamic shape of the front of each of the ducted fans 106, with the bottom of each ducted fan 106 protruding forward as a lower front induction scoop 301 and with the top of each ducted fan 106 sloping down from an upper front induction scoop 302 to the lower front induction scoop 301, thereby creating more lift and less drag. This lifting air intake duct design may create a low pressure area 206 in the bottom front of the duct which in turn creates lift. This design may reduce or eliminate the need for more wing area and in turn may reduce the weight of the aircraft.

FIG. 3a also shows a high pressure inner compression chamber 306 located between the two rows of rotating fan blades—front 108 and rear 109—in each ducted fan 106. The front blade actuator 107 changes the pitch of the front blades 108. By increasing the pitch of the front row of blades 108, air is pulled in and compressed in the high pressure inner compression chamber 306. The rear blade actuator 210 changes the pitch of the rear row of blades 109. The rear blades 109 pull the air from the high pressure inner compression chamber 306 and exhaust the air through the low pressure expansion chamber 216 thereby creating forward thrust.

The blades in each row may have variable pitch controlled by fly-by-wire computers which relay information to the front blade actuator 107 and to the rear blade actuator 210 to adjust the angle of the blades. Gyros located in the avionics bays may send a computer signal to the blade actuators 107, 210 to help control the stability of the aircraft in hover. The blades may be capable of self feathering and lining up in an identical configuration behind one another within each ducted fan 106 to help reduce drag and to increase air flow through the ducts, should an engine be lost or shut down. This feathering feature may extend the range which can be flown with one engine.

Each ducted fan 106 may also have a rear air deflector 110 mounted vertically, horizontally, or in another desired configuration on the rear of the ducted fan 106 when positioned for forward flight or other flight condition. This deflector 110 may be controlled by a fly-by-wire actuator 300 and may divert air to the left, right, or other desired direction to help stabilize the aircraft when it transitions from flight to hover or undergoes another desired maneuver. While in hover mode, the deflector 110 may divert the air to provide the ducted fans 106 with the capability of moving the aircraft sideways. Additionally, the air deflector 110 on the rear of the front ducted fans 106 may move one way while the air deflector 110 on the back of the rear ducted fans 106 may divert in the opposite direction or another desired direction, thus giving the aircraft counter-rotation capabilities.

FIGS. 4a, 4b and 4c show the position of the ducted fans 106 in forward flight, hover, and reverse, respectively.

FIG. 4a shows the position of the ducted fans 106 for forward flight and for take-off in conventional fixed wing mode.

FIG. 4b illustrates the position of the ducted fans 106 in hover and for vertical take-off. As the aircraft is lifting vertically as shown in FIG. 4b, forward movement may be accomplished by a computer controlled duct rotator actuator 124 rotating the ducted fans 106 forward toward the position shown in FIG. 4a to create forward movement until such speed is reached that sufficient airflow over the lifting surfaces creates lift, and the aircraft transitions from vertical to horizontal flight.

While in forward flight as shown in FIG. 4a, the ducted fans 106 may remain in aerodynamic alignment with the fuselage 100 as with a conventional fixed wing aircraft. When transitioning from horizontal flight to vertical flight, the duct actuators 124 may be rotated upward to slow the forward motion as shown in FIG. 4b. This decreases the air speed thus reducing the airflow over the lifting surfaces, and as the ducted fan 106 is rotated back to the upward position, it may increase the vertical thrust of the variable pitch blades. The actuators 124 may turn the ducted fans 106 past vertical as shown in FIG. 4c to slow the aircraft to a complete stop of forward motion. The tilted duct rotator actuator 124 may also control forward and reverse motion in hover by moving the ducts 106 forward or backward, respectively.

Description of Alternative Embodiment—UAV

In this embodiment, the aircraft may be adapted to perform as an unmanned aerial vehicle or UAV. This embodiment may include the sideways engine placement and in-line alignment and the fans encased in ducts as described for previous examples above. Most of the configuration of the aforementioned embodiment may remain intact, but some differences may be provided to help reduce the radar signature and to help provide for the carrying of weapons, large payloads, surveillance equipment, or the like. The aircraft and the engine may be scaled up or scaled down to accommodate different weight and/or mission objectives.

Figure 5:
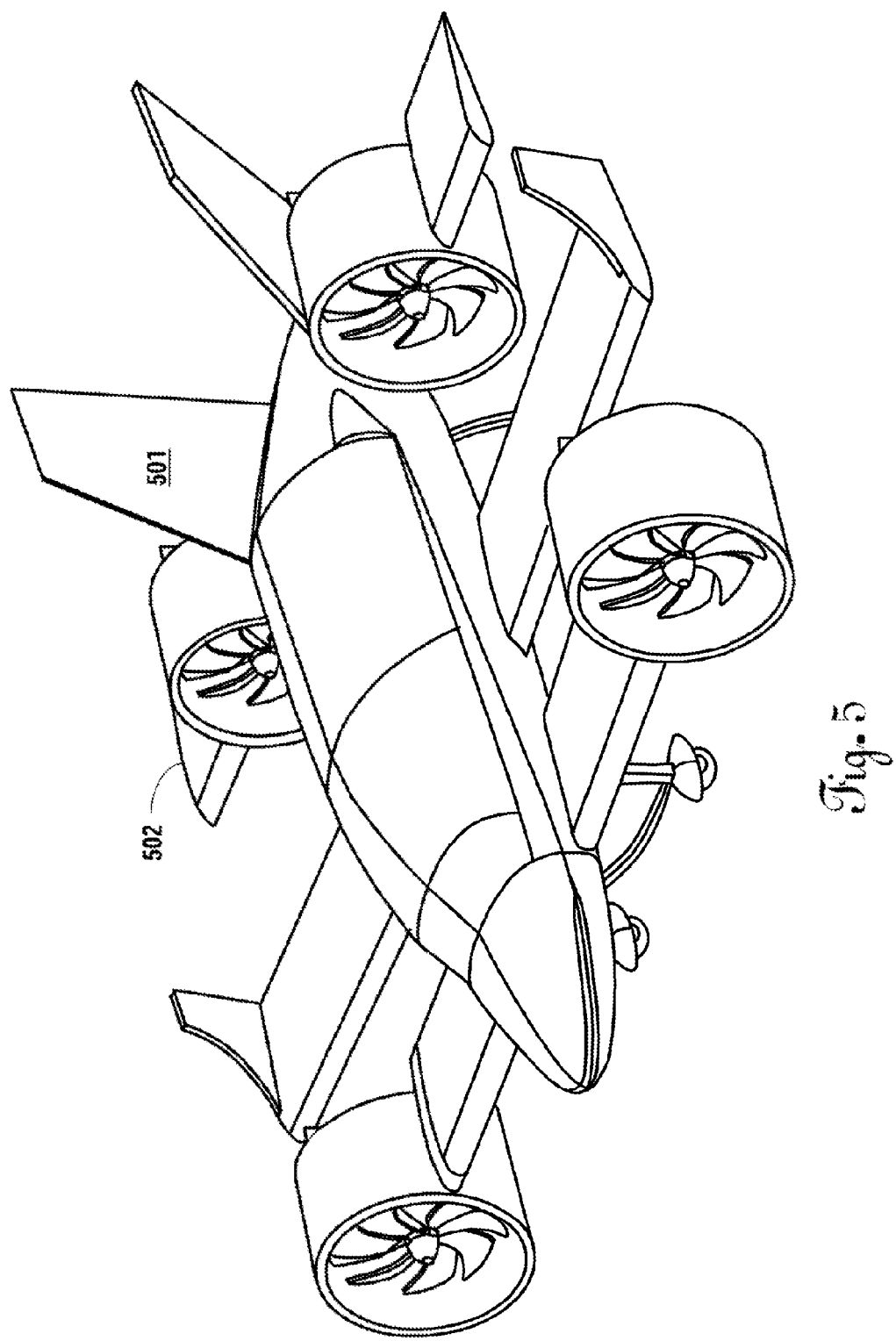
FIG. 5 is a front perspective view of a Personal Air Vehicle (PAV) or an Unmanned Aerial Vehicle (UAV) embodiment.

The UAV embodiment may include the same tail configuration of the previous examples, that is, the vertical stabilizers with the horizontal tail atop them, or as pictured in FIG. 5, it may utilize a V-tail assembly 501 and may include horizontal stabilizers 502 attached to the sides of and/or to the rear of the ducts (not shown). This V-tail configuration is similar to that of the Raptor F-22.

Other differences may include a retractable landing gear instead of a fixed landing gear, foldable wings or changeable wings for high altitude and other applications, a large compartment in place of a passenger cabin, and a camera location in the nose cone for surveillance. The cabin canopy may be manufactured of an opaque material rather than a transparent material and may become more aerodynamically streamlined by incorporating a lower profile. Bomb bay doors which open at the bottom of the aircraft for deployment of weapons, emergency food supplies, or the like may improve stealth capabilities because those items may be hidden and encased in the fuselage rather than placed on the wings.

The UAV embodiment may be used for military and reconnaissance operations for close in support. The UAV embodiment may also be used as an emergency vehicle to pick up wounded or stranded people in a dangerous location. The bolt-on or foldable wings may allow it to be trailered to a nearby or safe location before being sent on a mission. Thinner and longer wing extensions may accommodate higher altitudes and longer loitering. The ability of the aircraft to fly with one engine shut down and to take-off and land in close proximity to a target area may increase the distance the aircraft can fly on its designated fuel allowance. The engine may have the ability to alternate piston firings which also may increase fuel economy while keeping the aircraft aloft using very little horsepower.

Since the fan blades may be encased in ducts, and since ducted fans are quieter than propellers or jet engines, less radar signature may be produced. Also, since the engines may be mounted in the fuselage, less infrared signature may be produced. Stealth may therefore be much improved.

In some embodiments, most or all of the cabin area between the two engines may be used for storage of weapons, cargo and supplies, and/or surveillance equipment. VTOL capabilities may allow the aircraft to get closer to a target or to get into tight areas as for a rescue. The ability to take off and land in conventional mode may provide for more carrying capacity because the wings may be used for lift so the aircraft may carry more fuel and weight. Once the fuel has burned off on a long flight, a vertical landing is possible.

The V-tail configuration 501 could also be utilized on the passenger embodiments to improve the speed of the aircraft.

Description of Alternative Embodiment—Sport Plane

Figure 6:
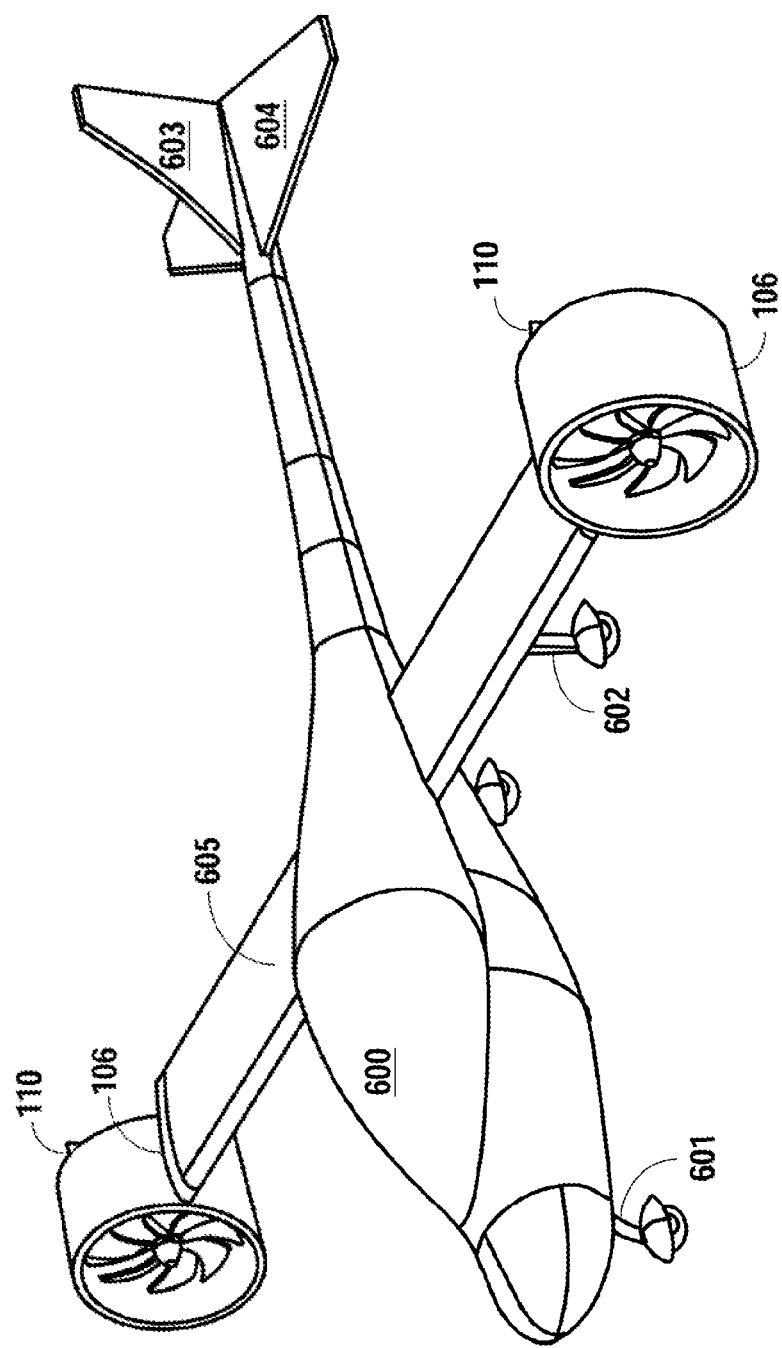
FIG. 6 is a front perspective view of a Sport Plane embodiment.

FIG. 6 shows an alternative embodiment of this invention as a VTOL sport plane. This embodiment may be comprised of an elongated aerodynamic fuselage with one double-ended driveshaft engine mounted sideways with respect to the fuselage and with a rotatable ducted fan 106 on each end of a main fixed wing 605 for a total of two ducted fans. The wing 605 may be level, dihedral, or anhedral. A passenger compartment/cabin 600 in the front portion of the fuselage may accommodate one or two people, and the engine may be located in the fuselage just behind cabin 600 and in line with the wing 605. An emergency parachute compartment may be located behind the passenger cabin 600 and just above the engine. The aircraft may have a fixed or retractable tricycle landing gear with one attached to the front 601 of the fuselage and two 602—one left and one right—attached to the bottom of the fuselage behind and below the passenger compartment 600.

In this embodiment, the engine, driveshaft, transfer case, duct rotator actuator, and ducted fans 106 may be provided for wing 605 in like manner as described above for canard wing 123 (see FIGS. 1, 2a, 2b). The double-ended driveshaft from each end of the engine may exit the fuselage through a transfer case, bearing, or other suitable support, run inside the main fixed wing 605, continue through a duct rotator actuator, and continue through a side of the ducted fan 106 and into a mid portion of the ducted fan 106 where it connects to a differential. As the driveshaft exits the right end of the engine, it runs through the right side of the wing and enters the right ducted fan 106 through the left side; and as the driveshaft exits the left end of the engine, it runs through the left side of the wing and enters the left ducted fan 106 through the right side. Inside each ducted fan 106, the differential may have two output shafts with each one turning one row of blades. Therefore, the two output shafts may respectively turn two rows of counter rotating blades in each ducted fan 106.

Two air deflectors—one vertical 110 and one horizontal (not shown in FIG. 6)—may be attached to the rear of each ducted fan 106. These deflectors may employ a DSS (Duct Stabilization System) and may use splitting capabilities to control the output thrust for increased stability. The horizontal air deflector may move the aircraft forward and backward, and may provide counter rotation of the aircraft in hover. The vertical air deflector may move the aircraft sideways in hover. In conventional airplane mode, the horizontal air deflector may control the roll.

The rear fuselage of the aircraft may be long and streamlined with a cruciform shaped tail comprised of one left 604 and one right (not shown) horizontal surface and one top 603 and one bottom vertical surface (not shown) controlling pitch and yaw, respectively, while the aircraft is in conventional airplane mode.

Description of Further Alternative Embodiments

Multiple Engines Placed End to End

In this embodiment, as shown in FIG. 2b, two or more engines may be provided fore, and two or more engines may be provided aft. Each set of engines may be placed end to end and sideways with respect to the fuselage. A common driveshaft or coupled driveshafts which act as one driveshaft 226 may run through the multiple engine blocks, with the shaft output on the outside ends of the outside engines running a pair of propellers or ducted fan blades. In this example, a transfer case may not be necessary for a backup for a dead engine, although a transfer case and supplemental drive shaft may be provided for further redundancy. The dead engine shaft may be driven by the running engine and/or engines with the dead engine freewheeling. The propellers or ducted fan blades may keep turning but at reduced power.

In some embodiments, freewheeling may be accomplished by coupling multiple engines (two or more) in-line with a continuous or coupled driveshaft and/or camshaft to effectively create a single power source and to provide for the freewheeling of one or more engines or for all of the engines, further described as follows. The freewheeling system may be formed by placing two or more engines (power sources) end to end and with each combined engine having a common driveshaft (which may be one integral, continuous shaft or multiple shafts coupled together) enabling the other engine or engines to freewheel. The sizes, horsepower, and types of power sources for such embodiments may be identical or varied. Output shafts for freewheeling can be utilized from each end, or from only one end, or from the middle of the coupled or continuous shafts. Coupling of multiple power sources may provide for the capability of freewheeling of one or more power sources while one or more other power sources are providing power to the other end of the freewheeling engine(s). It may also provide for all of the power sources to run together or for all power sources to freewheel together. If one power source fails, the other power source(s) will continue to turn the driveshaft, thus providing redundancy and enhanced safety.

In some embodiments, each of the power sources may provide a different power level for the coupled unit; e.g., if three power sources are coupled, one power source could be at idle, one could be at medium power, and one could be at full power, or alternatively all the power sources could be working at full power. More generally, each power source may be utilized at any selected power level. Significant fuel savings may result from regulating the power to only what is necessary at a given flight condition. In addition, any combination of the power sources could be selected to power or freewheel, and the power sources may be alternately selected so that the hours on each of the power sources may be maintained at a similar level if needed.

In some embodiments, coupling of the power sources with the resultant freewheeling capability may eliminate the need between units for clutches, transmissions, torque converters and/or differentials. This may simplify manufacturing and operations, thereby reducing costs of operation and maintenance and increasing safety. Alternatively, various freewheeling devices may be interposed between a power source and the driveshaft if needed.

In some embodiments, coupling two or more different types of power sources—such as one heat source (e.g., internal combustion or jet engine) and one electrical source, for example—may provide for various capabilities. The heat source may be utilized to turn an electric source into a generator, thus letting the heat source charge batteries, for example. The heat source may provide power while freewheeling the electric source. Alternatively, the electric source may provide power by freewheeling the heat source, or both the heat source and the electric source may be used together to provide hybrid power. As another alternative, both sources may be freewheeled and used in a regenerating mode to turn the electric source into a generator and provide braking and electrical current to charge batteries.

In some embodiments, the multi-source unit being used to power a generator(s) may continue to generate power—even with the loss of an engine—because the other engine(s) may accelerate to compensate for the dead engine, thus eliminating or minimizing loss of power.

In some embodiments, some of the power units for which this freewheeling concept may work best may be power sources which produce very little friction when the power source is freewheeling and the continuous or coupled driveshaft(s) are in-line, thus using internal driveshafts/crankshafts/cam shafts as the drive line. The internal mechanical parts of the engine may be used as the continuous drive line which turns the output shaft with power from the other power source(s).

In some conventional aircraft applications, coupling the engines for freewheeling may make it possible for one drive shaft from one end of the coupled power units to turn one propeller unit. This configuration may eliminate the need for other drive shafts when a back-up engine is needed, thereby reducing drag while still providing the "back-up" safety element of conventional twin engines or multi-engines.

In some embodiments, the freewheeling system may also work inside nacelles; e.g., by placing propellers on one end of multiple engines, between the engines, or at each end of the engines. This configuration may also be used to retrofit an existing aircraft by placing a propeller at one end of combined engines.

In some embodiments, this coupled and freewheeling power generating unit may provide both power and back-up power from each end or from one end of the coupled power unit and may be used in a VTOL aircraft to provide for powering the aircraft. It may also be used to improve the powering of existing VTOL aircraft currently in design, production, and/or use. Currently, many of these aircraft have propellers and blades at the end of the engines or in the ducts with their power units creating safety issues if one engine fails. In some embodiments, coupling engines together may allow the use of smaller engines thereby reducing the cost of manufacturing, especially for electric motors, since smaller engines generally cost less to manufacture.

Some examples of reduced friction power units that may be used for coupling may include engines such as the Perlex™, Axial Vector™, Sinusoidal Cam™, Dyna-Cam™, Radmax™, Rand-Cam™, Wankel™, and any cylindrical rotor, rotor, rotary, mill, vane, turbine, jet, electric and any other reduced friction power units capable of using its internal drive shafts in freewheeling applications as described herein. Alternatively, some conventional engines may be used if the amount of friction produced in them may be reduced.

In some embodiments, freewheeling may be provided in connection with actuators and servo motors. As shown in FIGS. 3A and 3B, a common shaft 307, 310 may be provided between the two actuators 107 and 210, which may be connected to allow redundancy for the control of the variable pitch blades 108 and 109 by allowing the freewheeling of a failed actuator. In some embodiments, common shaft 307, 310 may be hollow with a rod traversing through the middle, with the outer portion of the shaft serving to power blades 108, 109 and the inner rod serving to connect actuators 107, 210, such that if one of the actuators 107, 210 loses power the other of the actuators 107, 210 may continue to control the pitch of the first and second rows of blades 108, 109. This type of application may also be applied to many different scenarios for backup systems. For example, actuators and servo motors may be stacked (i.e., operably engaged with a common driveshaft) like the multiple engines described above, or separated and equipped with separate power sources in the event one power source fails. Such actuators and servo motors may be connected by a common shaft thus allowing freewheeling of a dead actuator or servo motor.

Some embodiments may have two engines fore and two engines aft with each pair of engines comprising a first engine fore and a next engine aft. Each pair of engines may be placed end to end and in-line and sideways with respect to the fuselage. Each engine may be controlled separately with the driveshaft from the right engine turning the propellers or ducted fan blades on the right side of the aircraft and with the driveshaft from the left engine turning the propellers or ducted fan blades on the left side of the aircraft. Transfer cases may be used in this example to pick up the power from the other engines.

Emergency Rescue Vehicle

This embodiment may use modifications to provide for an emergency rescue vehicle. The changes comprise shortened wings, a stubby nose, a front canopy that would fold or retract backwards, and a platform addition which would facilitate emergency escapes. The emergency vehicle could nose in to a building, cliff, or the like to provide an escape route for people trapped in, for example, a burning building. Ducted fans—as opposed to propellers—may permit the aircraft to get next to structures or into tight areas. The stubby nose and retractable canopy may allow access to the aircraft. An extendible/retractable ramp in the nose section may provide a stable emergency escape route.

Various embodiments of the aircraft described herein may utilize one or more of various types of engines, including Axial Vector, Dyna-Cam type engines, internal combustion, radial, piston, reciprocating, rotary, rotor, StarRotor, vane, mill, electric, hybrid, diesel, or similar type engines, alone or in combination, mounted in-line and sideways with respect to the fuselage. Hybrid engines may include one or more of each of a plurality of engine types. For example, a hybrid engine may include a diesel portion and an electric portion.

In some embodiments, an electric engine may have a first mode in which the electric engine drives the driveshaft and a second mode in which the electric engine serves as a generator driven by the driveshaft and charges a battery electrically connected to the electric engine. For example, the electric engine may operate in the first mode during take-off; and the electric engine may operate in the second mode after take-off.

In some embodiments, the front ducted fans may be mounted at the end of the canard wing, and the rear ducted fans may be mounted on each side of the fuselage just behind the passenger canopy. However, in other embodiments, the ducted fans may be mounted on each side of the front part of the fuselage, on each end of the main wing, and/or on the tail, depending upon the configuration of the aircraft.

In some embodiments, propellers may be utilized to handle larger loads with less horsepower, and the engines may be mounted in a higher position on the fuselage to provide clearance for the propellers. This configuration may accommodate from six to ten passengers or a large payload, for example.

Any or all of the embodiments may utilize an emergency parachute system. The aircraft may be equipped with a parafoil type parachute and one or more deployment rockets for emergencies. The deployment rockets may be solid fuel, liquid fuel, gaseous fuel, or a combination thereof. The parachute may primarily be used while in hover mode or at slow speeds, but may be used in other flight conditions if necessary or desired. The parachute and rockets may be mounted in the top of the rear portion of the fuselage behind the rear cabin, with one rocket on each side, for example. A cable system may be imbedded in the fuselage with a breakaway covering as described above. The supporting cables may be attached to the airframe at four attachment points as described above—two in the front fuselage near the outside end of the front engine and two in the rear fuselage near the outside end of the rear engine. The risers from the parachute may be attached to the supporting cables.

The emergency parachute may be deployed by the pilot via an emergency hand lever if the aircraft is in forward flight, or it may be automatically deployed by a computer if an engine loses power or the aircraft becomes unstable in hover or other flight condition. The parachute system may deploy the rockets, shooting them out at an angle and pulling the ends of the parafoil parachute in opposite directions, thereby moving the parachute away from the aircraft appendages and stretching the canopy to the full length of the parachute.

Airbag technology with small elongated tubes embedded in the parachute canopy cords and the outer edges of the parachute system may be utilized to immediately expand the parachute into the ultimate shape of a fully deployed parachute. The canopy may then be ready to receive the air, and this may result in the aircraft suffering a very slight loss of altitude from the time the parachute deploys until it is filled with air.

If the aircraft is moving in forward flight, computer controlled air sensors may determine if a need exists to apply or delay deployment of the airbag expander of the air canopy. This may minimize the shock from the forward air speed. When the parachute is opened, it may be steered via controls inside the aircraft. The parafoil parachute may give the aircraft a forward motion to help steer the aircraft to a safe area for a landing while descending under the parachute. If one engine is still operating, the parachute may act as a parasail to help keep the aircraft aloft while the pilot leaves a dangerous area and searches for a safe landing site.

Since the emergency parachute may be computer controlled in hover or other flight condition, it is possible the emergency backup transfer case and supplemental driveshafts may be bypassed or eliminated from certain embodiments thereby streamlining and simplifying the design of the output shafts from the engine to each differential. This may significantly reduce the weight of the aircraft.

The embodiments described above are some examples of the current invention. Various modifications, applications, substitutions, and changes of the current invention will be apparent to those skilled in the art. Further, it is contemplated that features disclosed in connection with any one embodiment, system, or method may be used in connection with any other embodiment, system, or method. The scope of the invention is defined by the claims, and considering the doctrine of equivalents, and is not limited to the specific examples described herein.

What is claimed is:

1. An aircraft comprising:
   a fuselage having a longitudinal axis;
   a first engine disposed in said fuselage;
   a second engine disposed in said fuselage;
   said first and second engines being operably connected to a common driveshaft traversing through said first and second engines and having an axis of rotation oriented transverse to said longitudinal axis of said fuselage;
   a first propeller operably connected to said common driveshaft; and
   a second propeller operably connected to said common driveshaft;
   wherein said first and second engines are configured for freewheeling such that if one of said first and second engines loses power the other of said first and second engines continues to power said first and second propellers.

2. The aircraft of claim 1 wherein each of said first and second propellers comprises a ducted fan.

3. The aircraft of claim 2 wherein said ducted fans are tiltable to facilitate VTOL and forward flight.

4. The aircraft of claim 3 wherein each of said ducted fans is mounted to a wing extending from said fuselage.

5. The aircraft of claim 2 wherein each of said ducted fans comprises counter-rotating blades.

6. The aircraft of claim 1 wherein each of said first and second engines is operable at a selected power level.

7. The aircraft of claim 6 wherein said first and second engines are selectable such that the hours on each of said first and second engines are maintainable at a similar level.

8. The aircraft of claim 1 further comprising a nose section having an extendable and retractable ramp.

9. The aircraft of claim 1 further comprising a retractable canopy.

10. The aircraft of claim 1 further comprising a parachute attached to said fuselage.

11. The aircraft of claim 10 wherein said parachute is mounted in a rear portion of said fuselage.

12. The aircraft of claim 10 further comprising one or more rockets configured for deploying said parachute.

13. The aircraft of claim 10 further comprising cables configured for attaching said parachute to said fuselage, wherein said cables are concealed in a recessed channel under a non-protruding breakaway covering which is aerodynamically flush with said fuselage.

14. The aircraft of claim 13 wherein said cables are attached to said fuselage at four attachment points.

15. The aircraft of claim 10 wherein said parachute is automatically deployable by a computer if said aircraft becomes unstable.

16. The aircraft of claim 10 wherein said parachute is manually deployable by a lever.

17. The aircraft of claim 10 further comprising an airbag expander configured for expanding said parachute into a fully deployed condition.

18. The aircraft of claim 17 wherein said airbag expander comprises elongated tubes embedded in canopy cords and outer edges of said parachute.

19. The aircraft of claim 17 further comprising computer controlled air sensors configured for determining whether to apply or delay deployment of said airbag expander.

20. An aircraft comprising:
    a wing;
    a first tiltable ducted fan mounted to a left portion of said wing;
    a second tiltable ducted fan mounted to a right portion of said wing; and
    first and second engines operably engaged with a common driveshaft which is in line with said wing and traverses span-wise through said wing and said engines from said first ducted fan to said second ducted fan.

* * * * *